US005696684A

United States Patent [19]
Ueberschaer

[11] Patent Number: 5,696,684
[45] Date of Patent: Dec. 9, 1997

[54] ELECTRONIC GUIDE DEVICE

[75] Inventor: Hans-Joerg Ueberschaer, Berlin, Germany

[73] Assignee: Robert Bosch GmbH, Stuttgart, Germany

[21] Appl. No.: 769,098

[22] Filed: Dec. 18, 1996

Related U.S. Application Data

[63] Continuation of Ser. No. 582,402, Jan. 3, 1996, abandoned, which is a continuation of Ser. No. 170,315, Jan. 3, 1994, abandoned.

[30] Foreign Application Priority Data

Jul. 4, 1991 [DE] Germany .................. 41 22 398.5

[51] Int. Cl.$^6$ .................................. G06F 165/00
[52] U.S. Cl. ............... 364/443; 364/499.2; 364/449.6; 340/990; 340/995
[58] Field of Search .................. 364/443, 449.2, 364/449.3, 449.5, 449.6; 73/178 R; 340/988, 990, 995

[56] References Cited

U.S. PATENT DOCUMENTS

| | | | |
|---|---|---|---|
| 4,504,913 | 3/1985 | Miura et al. | 364/449 |
| 4,527,155 | 7/1985 | Yamaki et al. | 340/995 |
| 4,570,227 | 2/1986 | Tachi et al. | 364/444 |
| 4,608,656 | 8/1986 | Tanaka et al. | 364/449 |
| 4,689,747 | 8/1987 | Kurose et al. | 364/449 |
| 4,951,211 | 8/1990 | De Villeroche | 340/995 |
| 5,041,983 | 8/1991 | Nakahara et al. | 364/449 |
| 5,067,081 | 11/1991 | Person | 340/995 |
| 5,107,433 | 4/1992 | Helldörfer et al. | 340/990 |
| 5,159,556 | 10/1992 | Schorter | 364/443 |
| 5,191,532 | 3/1993 | Moroto et al. | 340/995 |
| 5,197,009 | 3/1993 | Hoffman, Jr. et al. | 364/444 |
| 5,212,643 | 5/1993 | Yoshida | 364/449 |

FOREIGN PATENT DOCUMENTS

| | | |
|---|---|---|
| 2 603 727 A1 | 3/1988 | France . |
| 29 25 656 | 1/1981 | Germany . |
| 34 05 125 A1 | 8/1984 | Germany . |
| 40 33 829 A1 | 4/1991 | Germany . |
| 60-48573 | 3/1985 | Japan . |

OTHER PUBLICATIONS

"Automatic Map Guides Driver to his Destination", Machine Design, vol. 54, No. 22, Sep. 1982, p. 2.

D.L. Frank, "Information Systems: An Integral Part of Future Vehicles", VNIS Conference Record, Sep. 11–13, 1989, Ontario, Canada, pp. 85–88.

"Der Copilot heisst 'Carin'" [The Copilot is Called Carin], Automobil Revue, Sep. 1985, 80th year, No. 39, p. 51.

*Primary Examiner*—Gary Chin
*Attorney, Agent, or Firm*—Kenyon & Kenyon

[57] ABSTRACT

An electronic guide device, used preferably as a guide to cities or towns, which has all selection functions distributed over two operational-control areas on both sides of an LCD display for determining the location of geographic objects of a predetermined type and the most favorable routes to reach them; geographic objects of a specifiable type and of geographic areas being selectable via a first control panel from indexes, and grid squares being selectable via a second or third control panel. The device displays a geographic map capable of being moved and zoomed in on underneath a cursor and a scale, and is equipped with its own energy source, as well as with a circuit arrangement having a read unit, and an opening for disk-shaped recording media, a bus, and a microcomputer for determining location and for processing and supplying additional information.

18 Claims, 2 Drawing Sheets

ELECTRONIC GUIDE DEVICE

This is a continuation of application Ser. No. 08/582,402 filed on Jan. 3, 1996, now abandoned which is, in turn, a continuation of application Ser. No 08/170,315 filed on Jan. 3, 1994 now abandoned.

FIELD OF THE INVENTION

The present invention relates to an electronic guide device that is particularly suited as a guide to cities or towns and is provided with a wallet-size LCD screen for all relevant data, which would be of interest to tourists, for example.

BACKGROUND OF THE INVENTION

Known street maps are mostly made of paper and are folded, so that they become difficult to use in stormy weather. It may be that their handling ease could be improved by suitable folding types, but for the pedestrian, who must get quickly to the next public-transportation or taxi stop or who must skip from the index of street names to the grid square to be consulted on the street map, the time needed to leaf through and read the index, as well as to consult the grid squares is considerable. Moreover, the durability of the map is limited due to the many creases. Mechanical guide systems for cities are also known, which permit the displayed section of the street map to be scrolled, but they are not descriptive enough to provide an overall view. Common to both systems is that they only allow a location to be found with difficulty, and they can only be updated by purchasing a new street map.

Guide devices for motor vehicles are already generally known. These devices, however, are unwieldy and receive their voltage from the motor vehicle. For that reason alone, they are not suited as portable city-guide devices for tourists (Automobile Review: The Copilot is Called "Carin", September 1985, 80th year, no. 39, p. 51). Because this device is used in cars, it can only be manually operated when the traffic situation allows it. Therefore, besides the car computer, a location-finding system is also needed.

The German Patent 29 25 656 proposes a vehicle-navigation system that utilizes autonomously working motor vehicle components, in particular motion detectors and a route-search algorithm in the program-controlled evaluation unit, which requires external interpolation points (transmitters) to correct the exact position.

Another such device is the Blaupunkt Travel Pilot. This device is comprised of a compact-disk unit (CD-ROM player) and of a navigational computer having alphanumeric input capability, which is configured on one side of a monitor. The display field of the monitor has a definitively preset first marking for the location to be input and a second marking for the destination to be input. Displayed underneath the first marking, is a geographic map that can be moved and zoomed in on.

The exact functioning of such devices is dependent upon determining the position and defining the path covered and the travel direction using an odometer and compass, and is still so inaccurate, that it proposes a navigation by satellite, or rather, a navigation employing additional orientation aids.

To define a location, an initial orientation and a costly and complicated inputting of street names on the alphanumeric keyboard is required, and to correct the existing position, there must be a repeated inputting in time intervals.

Contrary to existing guide devices, which for the most part are supposed to point out the direction to be taken for navigational purposes, the aim of the present invention is to provide a helpful support in determining one's own location, or rather the locations of special geographic objects of a predetermined type, and the paths leading to them and favorable means of transportation, etc.

The object of the present invention is to improve the ease of handling, the adjustment of the point of departure, the speed in defining location, and the updating capability for a device of the type mentioned at the outset, while providing the simplest possible operation.

Based on the color-display capability of LCD displays prevalent in well known and other devices, all relevant data pertaining, for example, to a large city, such as a street map, a street index, as well as all important or interesting points about the city, can be input into and displayed on a hand-size electronic device serving as a guide to the city, by using an interchangeable memory card or CD-ROM.

The present invention starts out from the idea that such memory cards can easily be created or updated for every metropolis using computers, and could be made available in all major languages at travel agencies, hotels, or postal counters. When the memory card is inserted into a current-status device situated at such above-mentioned or other locations (for example phone booths), the position is noted on the memory card.

A microcomputer installed in the electronic city-guide device makes it possible for the optimum path between two points to be clearly displayed. This considerably facilitates the operation for pedestrians, who must get quickly to the next public transportation or taxi stop, or who must search the index of street names on the map and skip to the grid square to be consulted.

To overcome the complexity of the street map, a specific plane is provided to allow a number of possible destinations to be selected for display and, at the same time, unnecessary information to be suppressed from the display.

Planes having more complete information can be overlaid one after the other, in which case the total image of the street map or of a certain selectable section of this map can be reproduced to the extent that the number of superimposed planes is increased. Also, by combining selected planes, one can achieve representations which would not be feasible with a conventional street map, such as combining and exclusively displaying bike paths and parks or paths, and specific comfort stations (WCs). Post offices, banks, hospitals, and other important facilities that are closest to one's location are immediately apparent and can, therefore, be reached more quickly by taking the optimum routes. At the same time, when one selects the scale in conventional street maps, a gradual enlargement is not possible.

DETAILED DESCRIPTION

Figure 1:
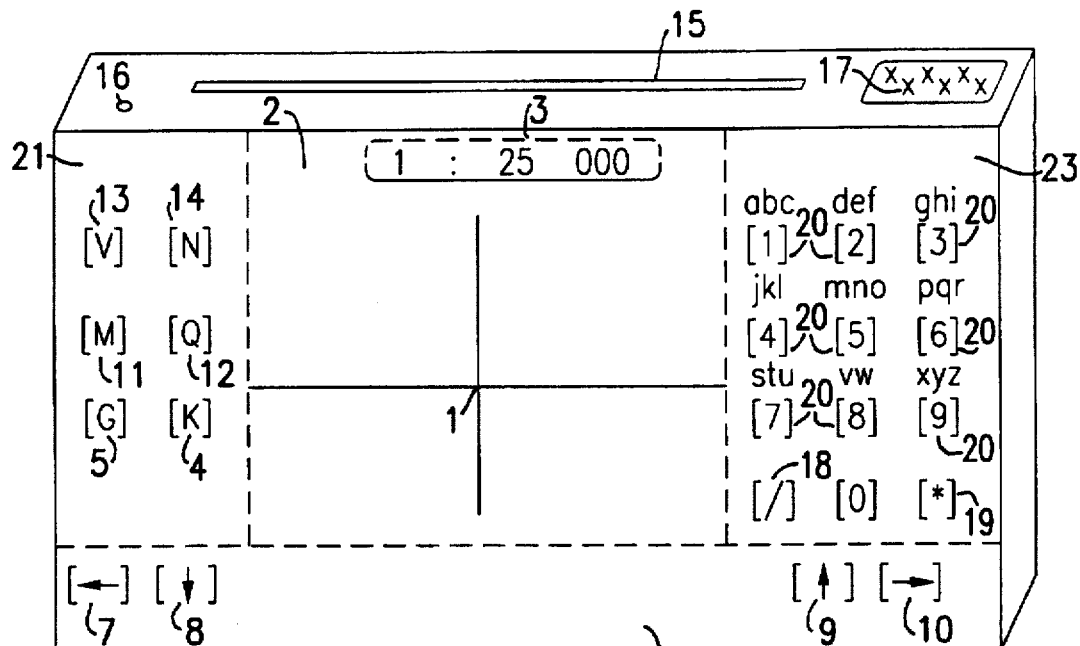
FIG. 1 is a schematic representation of the general appearance of an electronic guide device in accordance with the present invention.

FIG. 1 shows the general appearance of an electronic guide device in accordance with the present invention.

The device is set up for two-handed operation. On each side, the electronic city-guide device has operational control elements in control panels and, in the middle, the actual display with the cursor (as a line or cross).

At one place, the electronic city-guide device has a scale display 3 and, on the left side in the first control panel 21, first and second operational control elements 4 and 5 for switching the scale and, thus, the depiction of the map section in the LCD display 2. It has other operational control elements 18 through 20 in the right control panel 23 for selecting at least one other grid square, positioning elements 7, 8, 9 and 10 in the second control panel 22 for the relative moving direction of the cursor cross 1 in the LCD display 2, third and fourth operational control elements 13 and 14 in the first control panel 21, as well as a fifth menu-control element 11, and a sixth operational control element for acknowledgement 12 (Q-key). The insert slot 15 for the CD-ROM or for the memory cards is located on one side, preferably in the top area. In one other variant, the insertion is realized on the rear side. The connections for an external power supply 16 and for a computer 17 are likewise preferably arranged.

Figure 2:
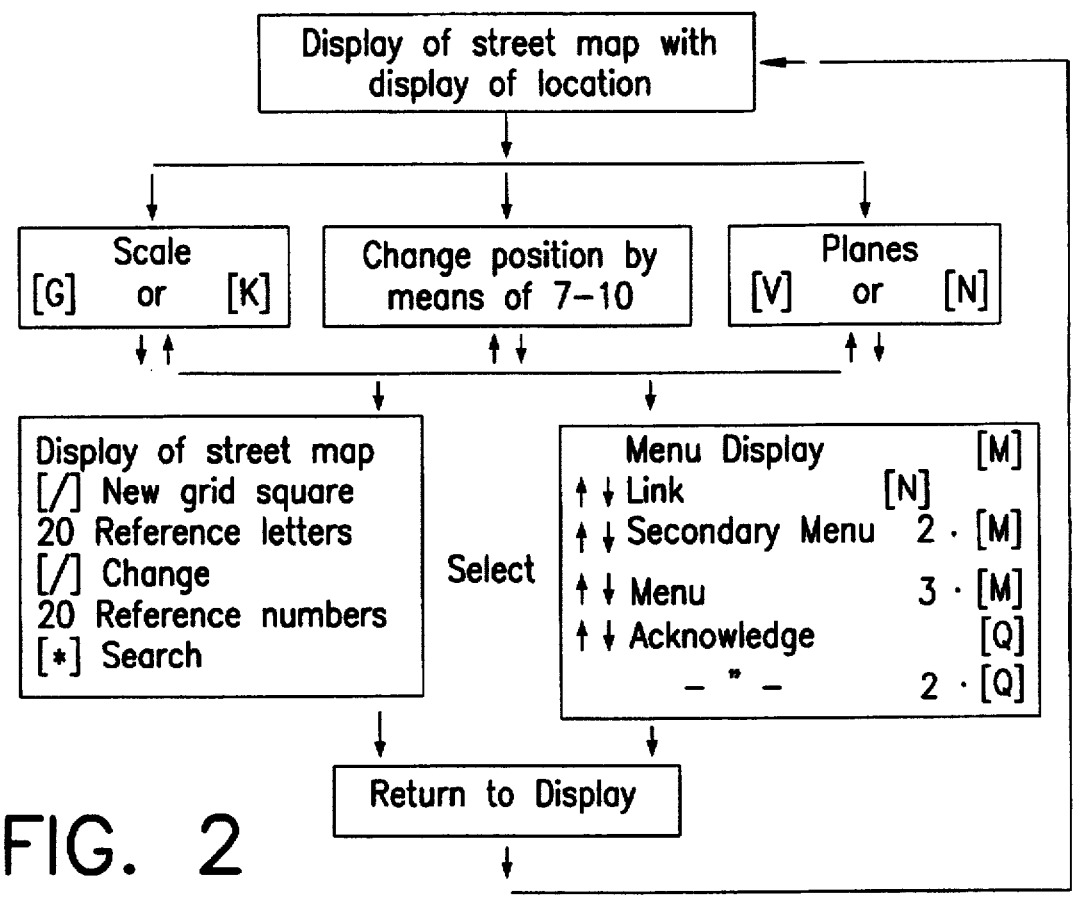
FIG. 2 is a flow chart depicting the operation of the electronic guide device of the present invention.

FIG. 2 clarifies the functional sequence of the operation. After the unit is turned on, an image of the cursor 1 is formed as a cross on the street map or as a line on the index of streets. It is preferable for the street map or a part of it to be displayed for one's own location, which is input by the memory card.

When the entire street map is first shown, this is done with few planes, which display suburban railways, subways, together with corresponding stations and important streets in the LCD display 2. The scale 3 of the map representation is displayed, or inserted in the LCD display 2 at one preferred point. Actuating the operational control element 4 or 5 switches the scale, thus optionally to a smaller or larger display of the map section in the LCD display 2.

At least one other grid square can be selected in the permanently preset scale of 1:150000 by means of the operational control element 18 in the right control panel 23. First, an alphabetic group is input, for example the field [ghi], with the operational control elements 20. By actuating the operational control element 18, the switch is then made to a numerical input, for example [10]. The operational control element 19 is then actuated to switch to the search for the grid square [ghi10], which is subsequently displayed on the LCD display 2.

The middle of the image is finely positioned in relation to the cursor cross 1 by shifting the street map opposite the arrow direction, which is indicated on the positioning elements 7, 8, 9, 10 and which corresponds to the relative moving direction of the cursor cross. The movement of the cursor cross and the street map relative to one another takes place diagonally, when the two corresponding positioning elements, for example 7 and 8 or 9 and 10, are actuated.

When the menu-control element 11 is actuated, the index of streets appears in the display. This index can be scrolled up and down by means of the positioning elements 8 and 9, or rather leafed through to the right and left with the positioning elements 7 and 10.

When the menu-control element 11 is actuated once more, a secondary menu or an alphabetized index of the individual planes appears in the LCD display 2. If the menu-control element is actuated a third time, the street index (main menu) appears again in the display.

The street name invoked in the main menu and situated on the cursor line 1 can be scanned in the secondary menu for any existing stations, banks, spas, bus lines, cafes, first aid stations, airports, stops, hotels, restaurants, taxis, etc., in the same manner as described above by means of the positioning elements 7 through 10.

When needed, one can induce objects (individual planes) to be combined using the third operational control element 13, after the acknowledgement is released by the sixth operational control element 12. Actuating the menu-control element 11 two times places the cursor line again on the first object (one of the planes). However, that next plane, with which the first is supposed to be combined and displayed, is selected now in the index by means of the positioning elements 7 through 10.

The acknowledgement released by the operational control element 12 causes the address, or rather only the house number, and possibly the telephone number of the object selected in the index to be displayed as a plane. In this display, an image of the cursor is formed as a horizontal line, or its display is completely suppressed. The other variant consists in a permanently imprinting a cursor cross 1 on the LCD display. A further acknowledgement causes the street map to be displayed in the LCD display 2 having a cursor cross.

The linking operation can be carried out repeatedly with other planes. In the same way, it is possible to combine street names, which are set up in the main menu, by means of the third operational control element 13, when a previous acknowledgement had been released by the sixth operational control element 12. In the same manner as described above, it is possible to link street names and objects situated in or rather on other streets. After the sixth operational control element 12 is actuated again, the system returns to the display of the street map. The cursor cross 1 is then situated on the first object of the first selected plane in the street map, or rather on the last selected street.

The set-up is simplified by invoking one particular special plane in the secondary menu, which causes a specific number of planes to be displayed simultaneously in a standard combination. The acknowledgement is again released by the sixth operational control element 12, and information pertaining to the number that is displayable in the selected scale and pertaining to selected, interlinked objects initially arrives at the display. Actuating the sixth operational control element 12 once more again causes the system to return to the display of the street map.

On the one hand, one can use the third control panel 23 to position the cursor cross that is situated over the first selected object or rather over one's own location over another point on the street map, in that an image of the newly selected street map section is formed under the cursor cross 1. The scale is then changed by the first and second operational control elements 4 and 5.

On the other hand, the position of the cursor cross can be changed by pushing away the street map displayed underneath it by means of the operational control elements 7 through 10. If the menu-control element 11 is now actuated, the list of street names appears, in which case the name of the street situated on the top right, closest to the cursor cross 1, is portrayed on or above the cursor line.

While in the manner just described above, one is able to use the menu and the secondary menu to search for street names with respect to interesting objects located on those streets, for example with respect to the sights of the city, entire sections of the city or rather the entire street map, or even the smallest grid square are able to be simply searched with respect to interesting objects. For this purpose, additional planes are directly added by employing the third operational control element 13, in particular in a sequence weighted by the issuer of the memory cards, or subtracted by employing an additional fourth operational control element 14. To solely depict objects of one plane in relationship to the entire street map, the possibility exists to invoke and acknowledge a special name in the menu and, after that, to set up and acknowledge the type of objects asked for (for example, all restaurants, bus stops, etc. located in the city zone) in the secondary menu.

The present invention will be clarified in greater detail on the basis of an example. If the grid square [ghi10] is selected, the operational control elements 7 through 10 can be used to position the grid square 19 located in the surrounding district underneath the cursor cross. The scale is then reduced and further positioning is carried out, until the grid square [i9xy] being searched for, for example [i987], is reached. Preferably, an image width/height ratio of 1:1 is realized. In principle, however, other ratios are also conceivable.

When such a grid square, for example i9, is defined through the selection of 26 letters and 26 numbers, then a geographic surface of 5·5 km$^2$ is reproduced in a display field size of 10·10 cm$^2$ on a scale of 1:50,000. The smallest displayable scale that can be selected with the first operational control element 4 amounts, for example, to 1:5000, which is why city zones having a horizontal and vertical extent of 50 m per cm are able to be portrayed with an image width/height ratio of 1 to 1. A maximum of 100 planes are able to be cumulated with the third operational control element 13, and then reduced to a desired number, for the sake of clarity, by means of the fourth operational control element 14. $10^4$ bits are available in one plane in the memory card, for example, for each of the 67,600 smallest grid squares on a scale of 1:5000 The memory capacity can be increased by employing other suitable, disk-shaped recording media, so that smaller scales can also be realized. A manageable selection is possible with 10 to 100 planes, with more or less complete information, or rather with special planes containing already cumulated information, for example, sites for sporting events at an Olympics.

In continuation of the present invention, extra cards, or rather extra recording disks, in particular extra CD-ROMs are inserted into the insertion slot 15 of the device for the special planes. It is thus made quite convenient for an organizer of fairs, Olympic events, folk festivals, etc., to provide visitors with current information about the location of the event on the street map, about favorable means of transportation for getting there, and about the times of the events, or rather the opening times.

Each special plane $Z_n$ contains the objects of at least one set, for example $Z_1$: towing service, car rental, camping sites, parking garages or parking lots; or $Z_2$: buses, suburban railway, streetcars, subways, stations, airports, taxis; or $Z_3$: fishing sites, bathing sites, boat rental, river bridges, sluices, lakes, swimming pools; or $Z_3$: antique stores, banks, book stores, cafes, hotels, post offices; or $Z_4$: doctors, spas, first aid stations, hospitals; or $Z_5$: exhibitions, observation towers, movie theaters, concert halls, museums, sights, theaters, zoos; or $Z_6$: bike paths, hiking trails, gardens, parks, and other sets.

In one variant, the objects are arranged strictly alphabetically and can be put together in any desired combination. In another variant that is optimal in terms of memory, the order is only established later by the microcomputer.

It is especially advantageous to be able to select a desired combination when different objects (planes) of different streets from the index of streets (menu) are to be displayed as objects in combination with one another. Hiking trails or bike paths, which lead to or closely past the street, and can easily be reached by foot, can thus be linked with other objects (lakes, parks) located in other sections of the city, and can be displayed clearly, while all unnecessary objects (planes) are left out. It is only possible and reasonable to depict all the objects when the display is greatly enlarged (small scale), due to the resolution of the LCD display and, certainly, due to clarity considerations. This is why it is guaranteed that the first linked objects (planes) will be displayed as a priority, when one selects too large a scale, and for as long as the display of additional planes is suppressed, until one reduces the scale by actuating the second operational control element 5 (enlargement of the map sections). Given a scale set to the maximum of 1:1, 000,000, for example, a city area of 130·130 km can be displayed on the LCD display 2 (with a display field of 10·10 cm$^2$).

Figure 3:
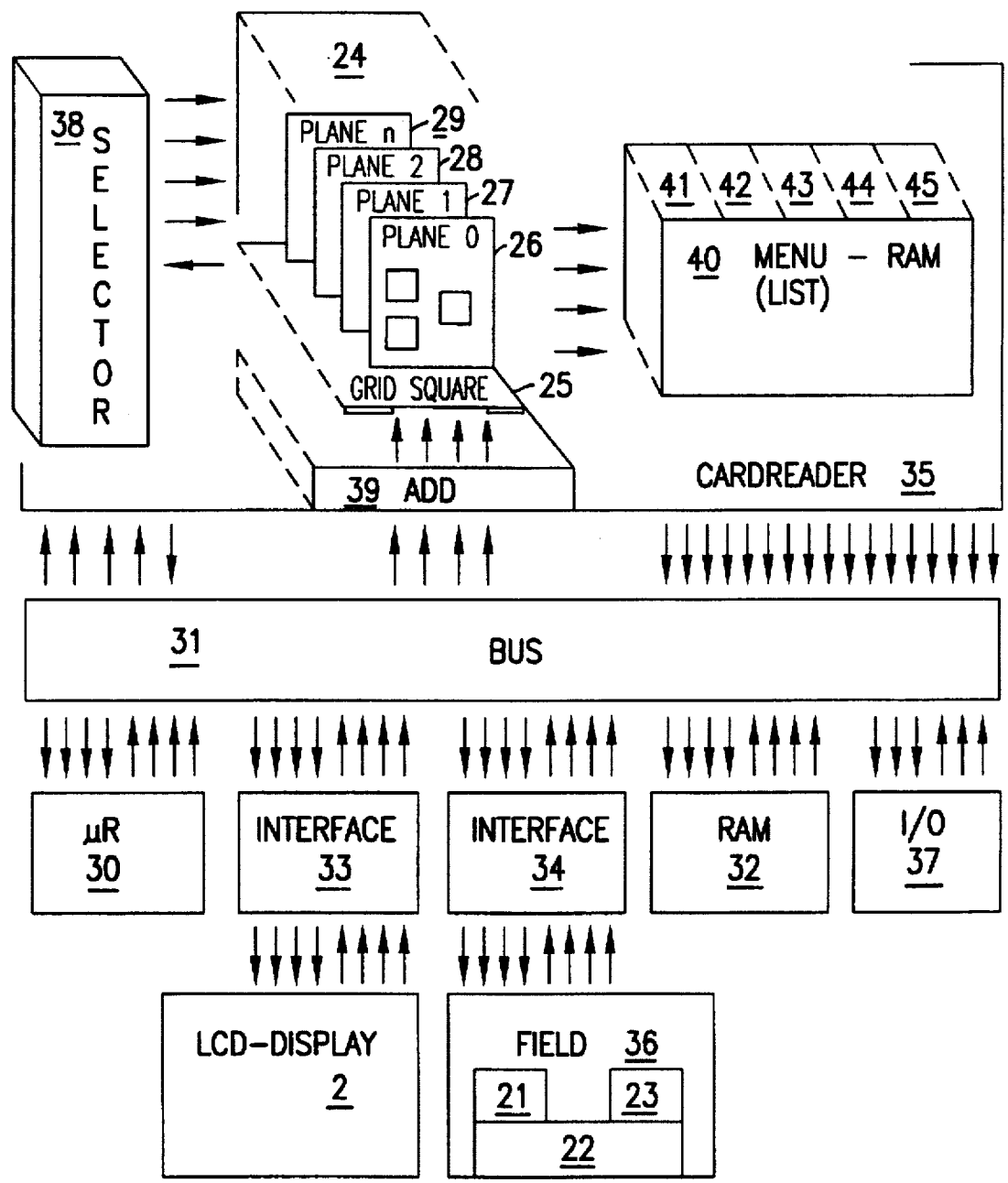
FIG. 3 is a block diagram of the electronic guide device of the present invention.

One advantageous refinement of the present invention is depicted as a block diagram in FIG. 3. The electronic guide device is comprised of a microcomputer 30, and of a programmable storage device 32 that is linked to the microcomputer in each case via a bus 31, of one interface 33 and 34 for an LCD display 2 and for a field-input unit 36, respectively, of a read unit 35, and of an input-output interface 37 for the connection 17 of an external computer. The device is equipped for two-handed operation, and is provided on each side with operational control elements in control panels 21, 22 and 23, and in the middle with a display including a cursor (as a line or cross). The third control panel 23 is preferably arranged to the right as a touch-sensitive, membrane-keyboard control panel 6, while the first control panel 21 is arranged to the left and contains the membrane switch elements 4 and 5, 11 and 12, 13 and 14. A second control panel 22 arranged under the LCD display likewise has membrane switch elements 7, 8, 9 and 10. The read unit 35 of the electronic city-guide device consists of a selector module 38 and of an addressing unit 39, as well as of storage devices 40 through 45, which include a storage area for the exact position of the streets and the index of streets (main menu) for the street names, of the grid squares 25 invoked by the selector module 38 (selector), and of storage areas for selectable geographic objects (information pertaining to planes 0 through n).

With respect to the power supply, the device is self-sufficient, and is equipped in particular with solar cells and/or batteries. It can be provided, in addition, with a connection for an external power supply 16.

When an interchangeable, pre-programmed memory card 24 or recording disk, in particular a CD-ROM, is inserted into the insertion slot 15, and the device is switched on, then via the bus 31, the addressing unit 39, and the selector 38, the microcomputer 30 triggers the grid square 25 containing the information pertaining to one's own location. This information is read into the storage device of the read unit 35 and is stored temporarily, until it is retrieved by the microcomputer. By means of the selector 38, and controlled by the microcomputer 30, the scale is considered as the number of displayable planes for one grid square of the inserted memory card. Thus, the maximum possible number of the combination is defined by invoking the number of planes. By inserting additional memory cards having special planes for the corresponding identical grid squares, the number of planes read into the storage device of the read unit can be additionally increased or modified, when this is required for a special display. To do this, after taking the first memory card 24 out of the insertion slot 15, one actuates the operational control elements 12, 13, 12 one after another. In this manner, the quantity of information can be cumulated on one grid square, until the storage device of the read unit is completely filled. This can be signalled by an additional, appropriately placed, flashing insertion on the LCD display 2.

In this case, after the operational control element 12 releases the acknowledgement, the remaining still available storage capacity of the card-reader storage devices 40 through 45 is determined by the microcomputer 30. If the number of planes to be retrieved into the card-reader storage device increases with the acknowledgement, the still available storage space will be increasingly exhausted. Via the selector 38, the number of planes to be combined, or rather the number of planes existing in combination in special planes to be read in, is specified by the microcomputer 30 in dependence upon the number of grid squares, which corresponds to the set scale. The microcomputer 30 also establishes whether a combination of several planes is added to the special planes, which would cause the still available storage capacity to be surpassed. As a warning, the indication "reduce positioning and scale" flashes at a suitable place on the display, or the entire display flashes, when the still available storage space is exhausted. If the position of the image section to be enlarged is placed under the cursor cross 1 by means of the positioning elements 7 through 10, and a reduction is carried out by means of the operational control element 4, the system prepares to free up storage spaces, i.e., to partially erase information. In addition, the number of planes to be read in can be increased by actuating the operational control element 13 to command additional information to be read in, which is assigned to the grid square in question and was produced during the acknowledgement released by the operational control element 12.

The intermediately stored planes 0 through n are linked by the microcomputer 30, while utilizing the storage device 32. In this case, the microcomputer 30 acts as a filter for the information to be presented and positions the latter so as to allow one's own location to be found under the cursor cross. If a new position for the cursor cross is input via the control panel 22, then the microcomputer 30 determines the grid square 25 to be selected. If the scale is also changed, then additional information pertaining to the map is read out of the memory card 24 into the card-reader storage device 40 through 45. This process is controlled by the microcomputer 30 via the selector 38, with the inclusion or exclusion of a preselectable number of planes. The information existing up to this point is thereby cumulated, reduced, or modified.

The street names are preferably stored in the plane 0. One can, thus, actuate the menu-control element 11 to initiate a quick search for a first number of the name belonging to the menu and to intermediately store it in the memory area 40. The microcomputer 30 can then call up the other grid squares to control the menu to be completed, put in order, and thus brought to the LCD display 2 via the interface 33.

The microcomputer 30 recognizes each position of the cursor line newly input via the interface 34 and the bus 31, in the case that this position is shifted by means of the operational control elements 7 through 10 on the list of the street names, without the operational control element 12 having to release the acknowledgement. Thus, the display of the new position is scrolled, or rather leafed through on the LCD display 2. Only after an acknowledgement is released, will the last input position be retained, and a secondary menu or an additional menu be able to be called up.

In the same manner, a selection can be made in the secondary menu and brought to the display. Additional planes of information pertaining to type, graphics, color, symbols, area information, alphanumeric information such as object names, addresses, telephone numbers and/or other information are advantageously used. The planes are required internally for the work of the microcomputer 30, without their being directly displayed on the display. Thus, information of one set, which is assigned to a few or all the grid squares, can be cumulated in the memory areas of the storage devices 40 through 45. Therefore, when the section of the street map to be displayed is larger than one grid square, all objects of one set, for example, all post offices, are displayed. The microcomputer 30 thereby monitors the operation of reading into the read-unit storage device and signals when the storing operation is stopped, in some instances after a visual and/or acoustical warning is given before the storage capacity is exhausted.

If the cursor cross 1 is positioned over one of the objects shown in the display of the street map, the exact address is readily retrievable in the manner already described, when the menu-control element 11 is actuated twice and an acknowledgement is released by 12. For a greater storage-space requirement, one can use a recording disk, in particular a CD-ROM, in place of the memory card 24.

In another variant that is not shown, the LCD display is coated with a transparent, pressure-sensitive layer, and all or at least some operational control elements are displayed as a software keyboard and are actuated by finger touch on the LCD display.

In a continuation of the present invention, the connection for external computers 17 can also be used as a printer interface, or to relay the display of the street map to other screens, in particular when only a black-and-white or a limited-color display on the LCD display 2 is realized with the device.

The present invention is not restricted in its design to the preferred exemplified embodiment indicated above. Rather, several variants, which make use of the solution presented here, are conceivable, even in the case of fundamentally different designs.

What is claimed is:

1. A portable hand-held electronic guide device controlled by a microcomputer, comprising:

a display for displaying a geographic map with connecting routes and geographic objects, the display having a cursor marking a selected location on the geographic map;

an alphanumeric input with several operational-control elements arranged in control panels for controlling the display on the geographic map or its map sections in a preset scale;

positioning elements for moving the displayed geographic map relative to the cursor;

a menu-control element for selecting, in conjunction with the positioning elements, at least two functions including scrolling through a street index on the display, and leafing through information planes of geographic objects filed by object type;

a third operational-control element for showing one or more selected information planes on the geographic map, a selected combination of the information planes being superimposed on the geographic map;

a fourth operational-control element for selecting at least one individual information plane of the shown information planes and erasing the at least one selected individual information plane on the geographic map; and a read unit for reading disk-shaped storage devices, with map data being stored on a first storage device and data for the geographic objects being stored on a second storage device, wherein the data for the geographic objects is associated with the selected information planes, wherein the microcomputer determines if the selected combination of the information planes exceeds an available storage capacity of the storage devices and wherein the microcomputer generates an indication when the available storage capacity is exceeded.

2. The electronic guide device according to claim 1, wherein the alphanumeric input includes a first control panel having alphanumeric operational-control elements with at least two letters and one number associated with each alphanumeric operational-control element.

3. The electronic guide device according to claim 2, further comprising:

a second control panel including at least one operational-control element for varying a scale of the displayed geographic map;

a scale display for displaying the scale of the displayed geographic map;

an opening for receiving therethrough the disk-shaped storage devices; and an energy source internal to the device; wherein the read unit and the microcomputer are coupled in a circuit arrangement via a bus.

4. The electronic guide device according to claim 3, wherein the first and second control panels are arranged on either side of the display allowing for two-handed operation of the guide device.

5. The electronic guide device according to claim 3, wherein:

the circuit arrangement further includes:
a programmable storage device,
a first interface to the display, and
a second interface to a field-input unit coupled to the control panels;
the programmable storage device and interfaces being coupled to the microcomputer, the read unit, and among themselves via the bus;

the read unit further includes
an addressing unit coupled to the bus,
a selector module for selecting information pertaining to the displayed map, and
said storage devices further storing information about the selectable geographic objects and additional information for the exact position of the streets and the index of street names, as well as names of selectable objects;

and the second control panel further includes
at least one operational-control element for adding information planes of geographic objects,
a fifth operational-control element for selecting a menu, and
a sixth operational-control element for acknowledging a previous entry.

6. The electronic guide device according to claim 5, wherein the microcomputer is coupled via the bus to an input/output interface for connection to an external device; and further comprising a connection device for coupling the electronic guide device to an external power supply.

7. The electronic guide device according to claim 5, wherein the microcomputer:

controls the selector module to select, in dependence upon the number of grid squares displayed, a number of information planes to be combined or a number of combined information planes in special planes to be read in.

8. The electronic guide device according to claim 3, wherein the microcomputer:

marks at least one of a starting location of the device and a current location of the device, on the basis of geographic objects visible on the display; and establishes the at least one of the starting and current locations on the basis of additional stored information and displays the at least one of the starting and current locations in the corresponding geographic area.

9. The electronic guide device according to claim 3, wherein the microcomputer determines the locations of selected geographic objects and the most favorable routes for reaching them, the selected geographic objects being selected using at least one of the following techniques:

selecting the selected geographic objects from a list of geographic objects;

selecting one or more map sections using the alphanumerical input; and using the positioning elements to position a map section relative to the cursor.

10. The electronic guide device according to claim 5, wherein selective actuation of the positioning elements has at least one of the following effects:

shifting an image displayed on the display in any desired direction under the cursor;

displaying geographic objects of one type near the cursor;

displaying the geographic object whose name is displayed proximate to the cursor, in the index of names of geographic objects; and displaying the additional information.

11. The electronic guide device according to claim 5, wherein:

the microcomputer combines streets in a main menu and geographic objects in a secondary menu by activation of the third operational-control element; and the display displays at least one of the street name, address, house number, and telephone number of the street or object last selected in the index.

12. The electronic guide device according to claim 11, wherein the microcomputer repeatedly links streets and information planes of the same or of different disk-shaped storage devices.

13. The electronic guide device according to claim 5, wherein the display displays a street map, with the cursor situated over a first object of the first selected information plane or over the last selected street, when the sixth operational-control element is actuated twice.

14. The electronic guide device according to claim 1, wherein geographic objects that have been linked are displayed together.

15. The electronic guide device according to claim 1, wherein geographic objects that have been linked are displayed with the most favorable routes between the linked geographic objects.

16. The electronic guide device according to claim 1, wherein an image of the cursor is displayed as a cross when the geographic map is displayed, and as a line when the index of streets is displayed.

17. The electronic guide device according to claim 3, wherein the disk-shaped storage devices are compact disks.

18. The electronic guide device according to claim 1, wherein the display is an LCD color display.

* * * * *